United States Patent [19]

Everson et al.

[11] Patent Number: 5,261,094
[45] Date of Patent: Nov. 9, 1993

[54] ASYNCHRONOUS REPLICATION OF DATA CHANGES BY DISTRIBUTED UPDATE REQUESTS

[75] Inventors: Rhonda S. Everson; Michael R. Felix, both of Houston; Boyd D. Robertson, League City, all of Tex.

[73] Assignee: International Business Machines Corporation, Armonk, N.Y.

[21] Appl. No.: 682,041

[22] Filed: Apr. 8, 1991

[51] Int. Cl.⁵ .................... G06F 15/40; G06F 15/16
[52] U.S. Cl. ................ 395/600; 364/DIG. 1; 364/282.1; 364/282.4; 364/283.4; 364/284.3; 364/284.4
[58] Field of Search ... 364/900 MS File, 200 MS File, 364/300 MS; 395/600 MS

[56] References Cited

U.S. PATENT DOCUMENTS

| | | | |
|---|---|---|---|
| 4,432,057 | 2/1984 | Daniell et al. | 364/300 |
| 4,627,019 | 12/1986 | Ng | 364/900 |
| 4,819,156 | 4/1989 | DeLorme et al. | 364/200 |
| 4,887,204 | 12/1989 | Johnson et al. | 364/200 |
| 4,914,570 | 4/1990 | Peacock | 364/200 |
| 5,113,499 | 5/1992 | Ankney et al. | 395/325 |
| 5,187,787 | 2/1993 | Skeen et al. | 395/600 |

OTHER PUBLICATIONS

Jim Gray et al. "The Recovery Manager of the System R Database Manager" ACM Comp. Surv. 13, No. 2, pp. 223-242 (Jun. 1981).
Ramez Elmasri et al., Fundamentals of Database Systems, Chapter 21, pp. 611-634, Benjamin/Cummings, 1989.
C J Date, An Introduction to Database Systems, Addison-Wesley, p. 421, 1986.
IBM Technical Disclosure Bulletin vol. 24, No. 5, Oct. 1981, "Copy Currency Central In Distributed Data".

Primary Examiner—Thomas C. Lee
Assistant Examiner—Wayne Amsbury
Attorney, Agent, or Firm—Mark A. Wurm; Jesse L. Abzug

[57] ABSTRACT

A method of replicating changes made to databases distributed throughout a computer network is described. A first program (TP1) in the Collector node instructs a second program (TP2) in the Collectee node to send all updates to a database since the last conversation. TP2 processes queries to retrieve any changes made since the last conversation between the Collector and Collectee nodes and send the data to TP1, which updates the copy of the database on its own system.

10 Claims, 5 Drawing Sheets

FIG. 5

COLLECTOR Pseudocode

```
1    SELECT CURRENT TIMESTAMP INTO :currtime
2    SELECT COUNT(*) INTO :n FROM COLLECTEE_TBL
           WHERE (TLC+DTC) < : currtime
3    DECLARE COLLECTEE CURSOR FOR
           SELECT LUNAME, TPNAME, TLC, XLATE_TBL FROM COLLECTEE_TBL
           WHERE (TLC + DTC) < :currtime
4    OPEN COLLECTEE
5    DO I = 1 TO n
6        FETCH COLLECTEE INTO :lu(I) :tpn(I) :tlc(I) :xlate_tlb(I)
7    ENDDO
8    CLOSE COLLECTEE 9    DO I=1 TO n
10       ALLOCATE lu(I) tpn(I) SYNC_LEVEL(CONFIRM)
11       RECEIVE_AND_WAIT WHAT_RECEIVED(rc)
12       IF rc = 100 THEN
13         Write log
14         RECEIVE_AND_WAIT WHAT_RECEIVED(CONFIRM_DEALLOCATE)
15         CONFIRMED
16         DEALLOCATE TYPE (LOCAL)
17       ELSE
18         IF rc < > 0 THEN error processing
19         ELSE
20            RECEIVE_AND_WAIT WHAT_RECEIVED(key, tlu, ...)
21            DO UNTIL no_more_data
22              IF xlate_tbl < > 'NULL' THEN
23                 Apply translate table
24              ENDIF
25              UPDATE Shadow_Tbl
                     SET TLU = CURRENT TIMESTAMP, x = :x, y = :y, ...
                     WHERE KEY = :key AND TLU < :tlu
26              IF key_not_found THEN
27                 INSERT INTO Shadow_Tbl
                       VALUES ( :key, CURRENT TIMESTAMP, ...)
28              ENDIF
29              COMMIT
30              RECEIVE_AND_WAIT WHAT_RECEIVED(key, tlu, ...)
31            ENDDO 32            RECEIVE_AND_WAIT WHAT_RECEIVED(CONFIRM_DEALLOCATE)
33            UPDATE COLLECTEE_TBL SET TLC = :currtime
                     WHERE LUNAME = :lu(I)
34            COMMIT
35            Write log
36            CONFIRMED
37            DEALLOCATE TYPE (LOCAL)
38         ENDIF
39       ENDIF
40   ENDDO
```

FIG. 6

COLLECTEE Pseudocode

1. GET_ATTRIBUTES PARTNER_LU_NAME(lu)

2. SELECT CURRENT TIMESTAMP, TLS
   INTO :currtime, :tls
   FROM COLLECTEE_TBL
   WHERE LUNAME = :lu 3. DECLARE QUERY CURSOR FOR
   SELECT * FROM Shadow_Tbl
   WHERE TLU BETWEEN :tls AND :currtime

4. OPEN QUERY

5. SEND_DATA DATA(SQLCODE)

6. IF SQLCODE not ok THEN

7.    Write log
8.    DEALLOCATE TYPE(SYNC-LEVEL)

9. ELSE

10.    DO UNTIL no more rows
11.      FETCH QUERY INTO : key, :tlu, ...
12.      SEND_DATA DATA(key tlu ...)
13.    ENDO 14.    SEND_DATA DATA(no_more_data)

15.    DEALLOCATE TYPE(SYNC_LEVEL)

16.    UPDATE COLLECTEE SET TLS = :CURRTIME
    WHERE LUNAME = :lu

17.    COMMIT WORK

18. ENDIF
19. EXIT

ASYNCHRONOUS REPLICATION OF DATA CHANGES BY DISTRIBUTED UPDATE REQUESTS

BACKGROUND OF THE INVENTION

1. Field of the Invention

This invention is to a method for propagating changes made to a database in a computer system to other databases in computer systems connected in a network. In particular, a method for synchronizing changes to relational databases is described.

2. Background Information

In many computer systems, the processing and storage components are distributed geographically and interconnected by means of one or more communication networks. Data is often distributed among the components and stored in relational databases. One such computer program for creating and managing relational databases is the DATABASE 2 (a trademark of IBM Corp.) program product, available commercially from IBM Corp. In large enterprises, it is often desirable for the databases in each computer, or node, in the network to contain identical information, such as address or phone data for employees.

The problem in such a distributed environment, however, is one of ensuring that any changes made to one database are propagated to the other databases in the system so that data remains consistent. This problem has been addressed in the prior art by automatically "pushing" any changes throughout the rest of the network. While this solution may be satisfactory under some conditions, it does not work well in complex networks. It is therefore desirable to provide a method for synchronizing changes to relational databases in a network.

OBJECTS OF THE INVENTION

It is the object of this invention to provide a method for synchronizing changes to relational databases in a computing network.

It is a further object of this invention to provide a method for synchronizing changes to databases in a peer to peer relationship.

It is still another object of this invention to provide a method for synchronizing changes to databases in a hierarchical relationship.

SUMMARY OF THE INVENTION

These objects, and others to be described, are accomplished by the following method in which the node containing the "changed" database is referred to as the "Collectee" and the database to be updated is referred to as the "Collector". Data variables that exist in databases D1 and D2 are said to be shadowed in D1 if updates occur in D2 but not D1.

As updates are made on the Collectee node, each record is timestamped with the date/time of the update. If a record is deleted, a physical deletion does not occur but instead a delete indicator is turned on in the record.

In the first step, a first program (TP1) in the Collector node initiates a conversation with a second program 2 (TP2) in the Collectee node. TP1 instructs TP2 to send all updates to the table of interest (shadowed table) since the last conversation. TP2, in response to the call by TP1, receives and answers queries to retrieve any changes made since the last update and sends the data to TP1. TP1 receives the data and updates the shadowed table in its own machine. Control tables contained in both machines are updated to indicate the last date and time of updating.

BRIEF DESCRIPTION OF THE DRAWINGS

FIG. 5 shows a pseudocode listing for the Collector program.

FIG. 6 shows a listing of the pseudocode for the Collectee program.

DESCRIPTION OF THE PREFERRED EMBODIMENT

Figure 1A:
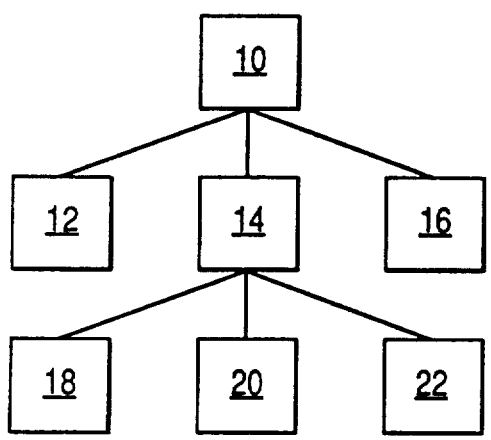
FIGS. 1A-C shows schematic representations of three types of network structures.

Present computer systems can be distributed in various forms. FIG. 1A shows a logical relationship in which processor 10 sits at the top and collects information from processors 12, 14, and 16. Processor 14 collects information from processors 18, 20 and 22. In the hierarchical logical configuration, updates flow up the hierarchy to processor 10. These updates then eventually flow back down the hierarchy so that lower level processors may receive changes made by those processors at equal and higher levels. Processors 12, 14, and 16 collect updates from processor 10. Processors 18, 20, and 22 collect updates from processor 14.

Figure 1B:
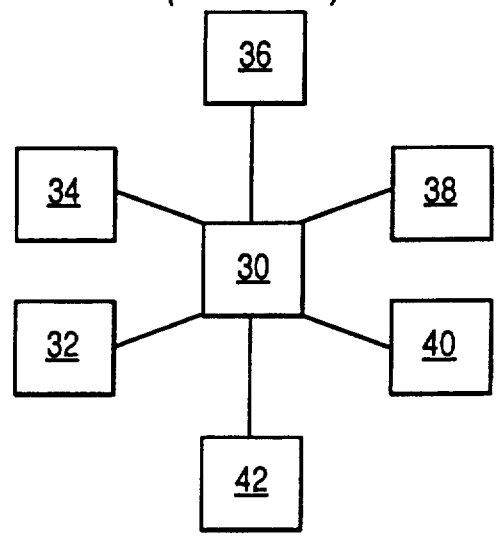
Figure 1C:
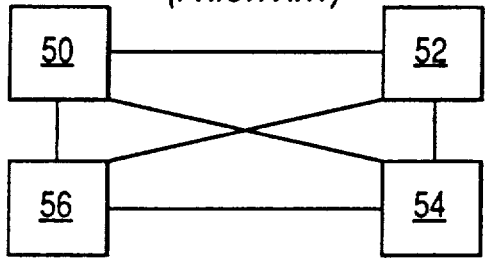

FIG. 1B schematically illustrates what is known as a star configuration in which processor 30 is the central node and is connected to processors 32, 34, 36, 38, 40 and 42. FIG. 1C illustrates a peer network configuration in which each processor 50, 52, 54 and 56 has a connection to every other processor within the network. Network configurations are well-known in the computer industry and further discussion of network structures are beyond the scope of this description and unnecessary for an understanding of the present invention.

Regardless of the type of network, it is often necessary for all of the processors or nodes to contain identical information in their databases. In the preferred embodiment, the database to be considered is a phone directory/address book for a corporation. It is understood by those skilled in the art that the invention is extendable to all types of databases.

Figure 2:
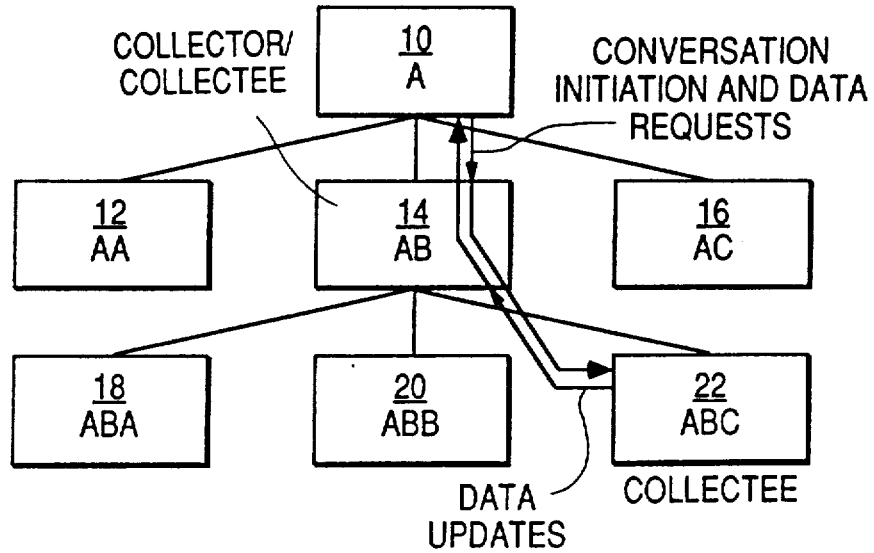
FIG. 2 shows a schematic representation of a hierarchical type of network in a collecting node.

Since the invention for synchronizing the databases to be described herein is the same for all network structures, the detailed description will be limited to the hierarchical structure as further shown in FIG. 2. In this example, node 22 has recently been updated with changes to its phone directory/address book. It is referred to as the Collectee node. Node 14 is known as the Collector node because it collects data from the Collectee node 22. In turn node 14 is in the Collectee node for Collector node 10. The shadowing process is always initiated by the Collector node. This ensures that no undesired data is sent to a node. The Collector node can be any node within the network. A node doesn't need to be only a Collector, it can also be a Collectee in another shadowing process, so the place the node has within the network does not matter.

The network configurations shown represent logical data flows only. A line connecting two nodes only means that a data collection takes place between those two systems. Physically, there may be several other nodes in between the Collector and Collectee. As long as the Collector and Collectee can talk to each other, it doesn't matter what the physical configuration of the network is.

Figure 3:
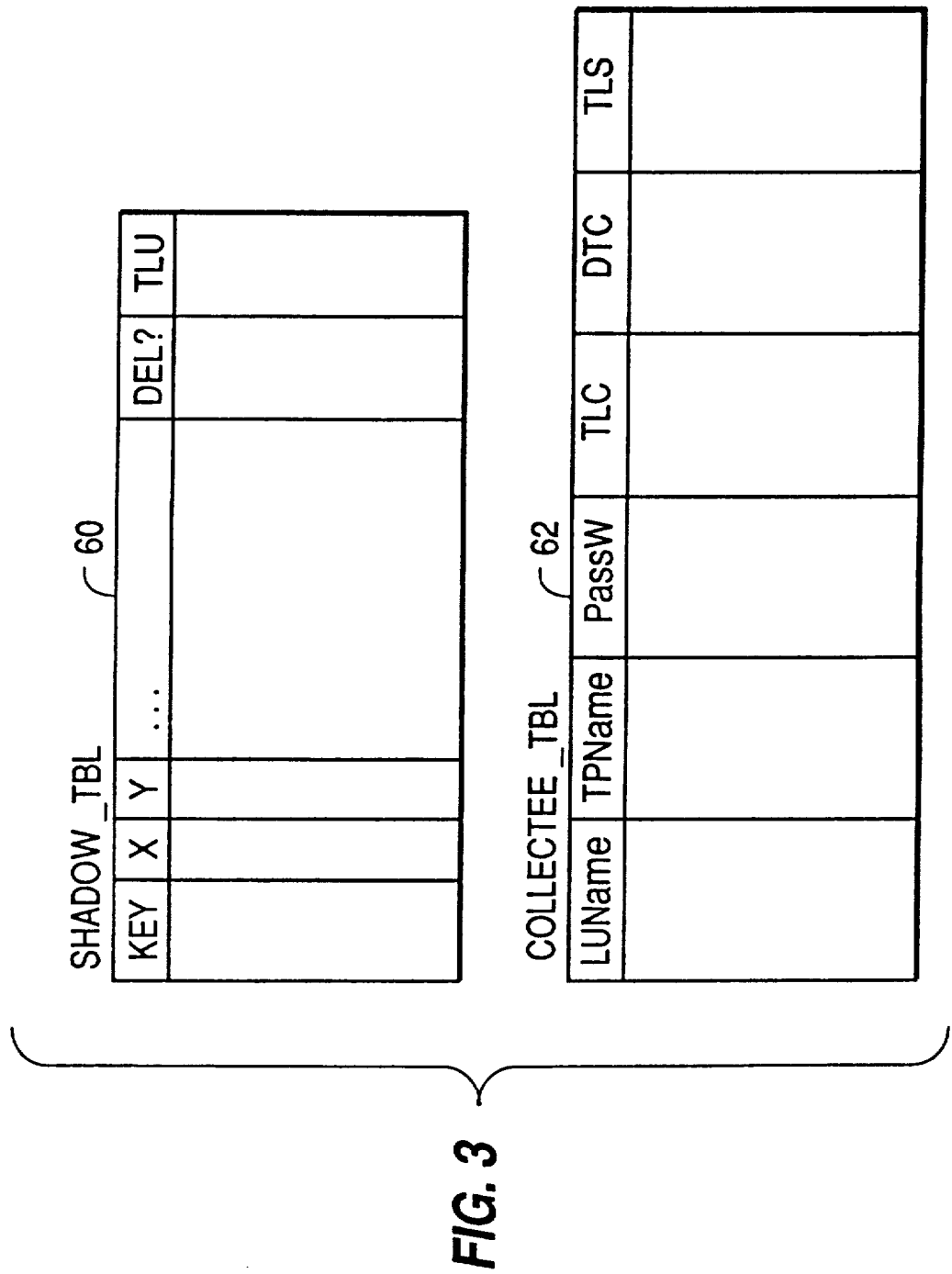
FIG. 3 shows representations of the shadowing support tables.

Referring to FIG. 3, the control table (shadow_tbl) 60 for the database to be shadowed in the Collector node is illustrated. Shadow_tbl 60 contains several data entries as follows:

key = identifier which uniquely identifies each row of unit data

XY . . . = represents columns in the data table del? = logical indicator that record has been deleted TLU = time last updated. (Time stamp when this row was last updated).

Also shown in FIG. 3 is the shadow control table 62 (Collectee_tbl) which is contained in the Collectee node. This table contains the following data:

LUName = network address for Collectee node

TPName = program (TP2) to invoke on Collectee node program

PASSW = security of password of program TP2 on Collectee node

TLC = time last called. (A time stamp of the last time a successful conversation was completed normally with TP2).

DTC = delta time between collections (amount of time between collection calls to this node.)

TLS = time last serviced. (A time stamp of the last time a successful conversation was completed with TP1. Updated by TP2).

Figure 4:
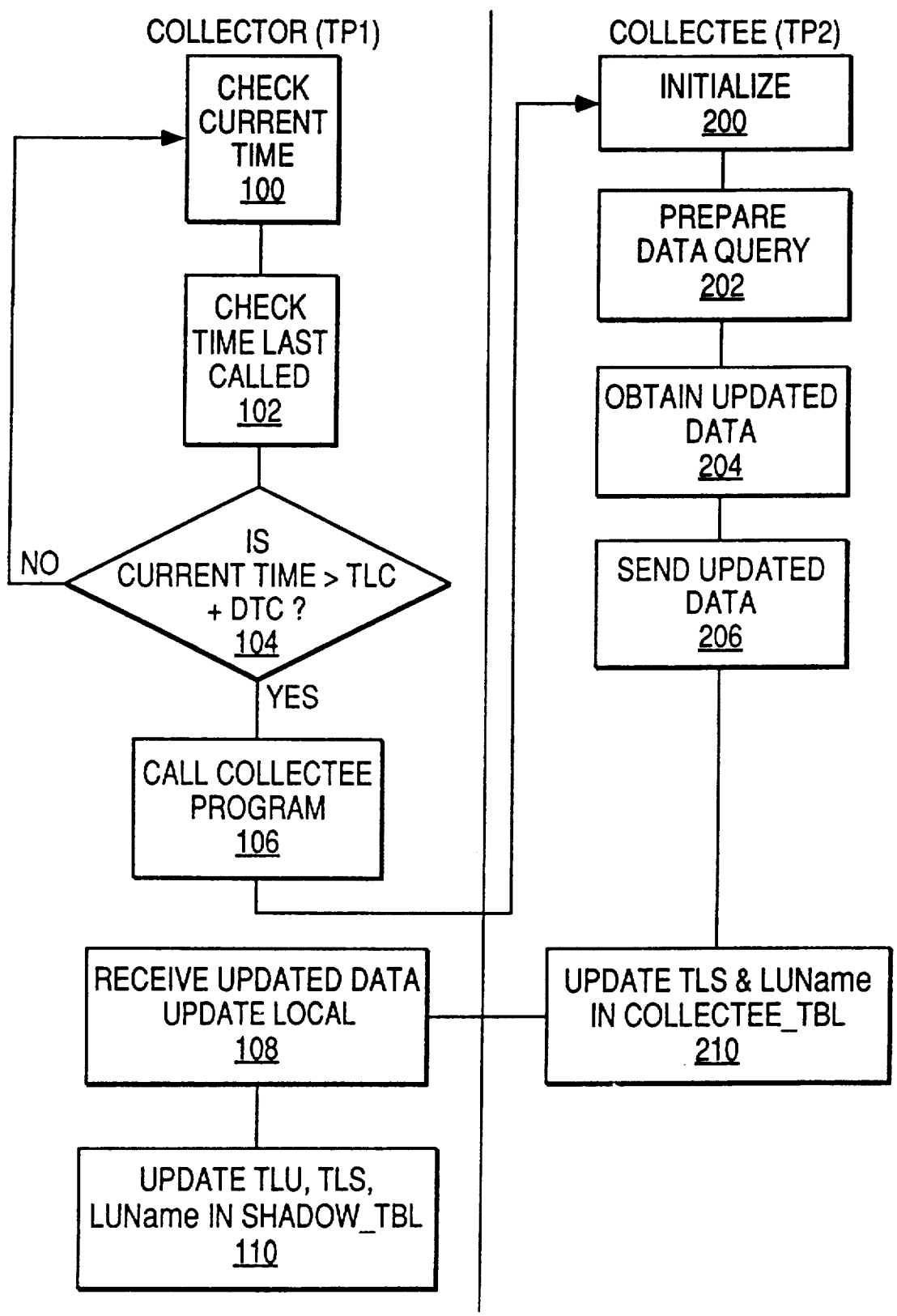
FIG. 4 shows a flow diagram for the Collector (TP1) and Collectee (TP2) programs.

Referring now to FIG. 4, the method of the invention is as follows. The steps in the left side of the Figure take place in the Collector node and are implemented by TP1. The steps in the right side of the Figure take place in the Collectee node and are implemented by TP2. Of course, since a particular node can be both a Collector and Collectee at different times, each node contains both TP1 and TP2.

In Block 100, the Collector node checks the current time. Block 102 checks the TLC in the Collectee_tbl 62 (FIG. 3). If the time since the last update exceeds the specified delta times (DTC) between conversational exchanges of the 2 nodes, then TP1 will initiate a conversation with TP2 in the Collectee node (Blocks 104, 106). If not, then Block 100 will continue, at regular intervals, to check the time until the delta time has been exceeded.

In the TP2 program in the Collectee node, initialization of the program is done in Block 200. Block 202 prepares a Structured Query Language data query to find data that has been changed in the phone/address book database. The changed data is obtained (Block 204) and sent to the Collector node (Block 206). When updating is complete, Block 210 updates the TLS in the Collectee_tbl.

TP1 then receives the updated data, applies the updates to its phone directory/address book database (shadow_tbl) (Block 108), and updates TLC in its Collectee_tbl. FIGS. 5 and 6 contain pseudocode listings for the Collector and Collectee programs, also known as TP1 and TP2 respectively. While these examples employ the LU6.2 communications protocol, it is readily apparent that any suitable peer-to-peer communications protocol can be used.

While the invention has been described with reference to a preferred embodiment, it will be understood by those skilled in the art that changes to the described method can easily be made without departing from the spirit and scope of the invention. For example, the computer network can be of any configuration and the database of any type. Accordingly, the invention shall be limited only as specified in the following claims.

We claim:

1. In a distributed computing environment, which includes a plurality of computers, each of which include at least one relational database and a control table, a method for replicating changes to one of the databases comprising the steps of:
    (a) periodically initiating an update conversation between a first computer and a second computer;
    (b) said first computer instructing said second computer to send to the first computer only all changes to its database since the last update conversation;
    (c) said second computer processing said instruction, preparing an update, and transmitting the update along with a time of transmission to the first computer, and updating the control table of said second computer with said transmission time;
    (d) said first computer receiving the said update and the said time of transmission and replicating all said changes in its database; and
    (e) said first computer updating its control table with said time of transmission of the said update.

2. The method as claimed in claim 1 wherein the computers communicate in a peer to peer relationship.

3. The method as claimed in claim 1 wherein the computers are arranged in a hierarchical relationship.

4. The method as claimed in claim 1 wherein said initiating step is performed at predefined time intervals.

5. The method as claimed in claim 1 wherein the second computer processing said instruction step includes preparing a data query in a structured query language format.

6. The method as claimed in claim 1 wherein the control table of each computer includes the time of the last update to the said relational database contained in said computer.

7. A method for maintaining identical information in a plurality of relational databases distributed in a plurality of computer systems comprising the following steps:
    (a) periodically triggering a first computer process in a first computer system which initiates an update conversation with a second computer process in a second computer system;
    (b) said first computer process instructing said second computer process to query its database and identify only all changes made to its information since the last update conversation of its information was sent to said first computer process;
    (c) said second computer process querying its database, preparing the update, transmitting only the updated information along with a time of transmission to said first computer process, and updating the control table of said second computer system with said transmission time;
    (d) said first computer process receiving the updated information and said time of transmission and applying the said updated information to its database; and
    (e) said first computer process updating its control table with the said time of the last update transmitted by the second computer process.

8. The method as claimed in claim 7 wherein the computer systems communicate in a peer to peer relationship.

9. The method as claimed in claim 7 wherein the computer systems are arranged in a hierarchical relationship.

10. The method as claimed in claim 7 wherein the control tables of each computer system include the times of last update to the relational databases contained in said each computer system.

* * * * *